United States Patent
Zhu et al.

(10) Patent No.: US 6,345,274 B1
(45) Date of Patent: Feb. 5, 2002

(54) METHOD AND COMPUTER PROGRAM PRODUCT FOR SUBJECTIVE IMAGE CONTENT SIMILARITY-BASED RETRIEVAL

(75) Inventors: Wei Zhu; Rajiv Mehrotra, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/106,427

(22) Filed: Jun. 29, 1998

(51) Int. Cl.[7] .................. G06F 17/30; G06F 13/00; G06K 9/54
(52) U.S. Cl. ................. 707/5; 707/3; 707/6; 382/305; 345/326
(58) Field of Search ............... 707/3, 6, 102, 707/104, 5; 382/209, 220, 305; 706/20; 345/326, 348

(56) References Cited

U.S. PATENT DOCUMENTS

| | | | |
|---|---|---|---|
| 5,579,471 A | 11/1996 | Barber et al. ............ | 345/326 |
| 5,652,881 A | 7/1997 | Takahashi et al. ......... | 707/104 |
| 5,893,095 A * | 4/1999 | Jain et al. ............... | 707/6 |
| 5,899,999 A * | 5/1999 | De Bonet ................. | 707/104 |
| 5,903,904 A * | 5/1999 | Peairs ................... | 707/526 |
| 5,983,237 A * | 11/1999 | Jain et al. ............... | 707/104 |
| 5,987,456 A * | 11/1999 | Ravela et al. ............ | 707/5 |
| 6,026,411 A * | 2/2000 | Delp ..................... | 707/104 |
| 6,035,055 A * | 3/2000 | Wang et al. .............. | 382/118 |

FOREIGN PATENT DOCUMENTS

EP   0 643 358 A2   9/1994   ......... G06F/17/30

OTHER PUBLICATIONS

"The QBI Project: Querying Images by Content Using Color, Texture, and Shape", by W. Niblack, et al, SPIE vol. 1908, 1993, pp. 173–187.
"Similarity of Color Images", by Markus Stricker, et al SPIE vol. 2420, 1995, pp. 381–392.
"Similarity Queries in Image Databases", by Simone Santini, et al, CVPR, 1996, pp. 646–651.
"Tools and Techniques for Color Image Retrieval" by John R. Smith, et al, SPIE vol. 2670, 1996, pp. 426–437.
"Core: A Content–Based Retrieval Engine for Multimedia Information Systems", by J. K. Wu, et al, Multimedia Systems, vol. 3, 1996, pp. 25–41.
"Netra: A Toolbox for Navigating Large Image Databases" by Wei–Ying Ma, Ph.D Dissertation, UCSB, 1997.
"A Relevance Feedback Architecture for Content–Based Multimedia Information Retrieval Systems", by Yong Rui, et al, IEEE Workshop on Content–Based Access of Image and Video Libraries, 1997, pp. 82–89.
"In Search of Information in Visual Media", by Amarnath Gupta, et al, Communications of the ACM, Dec. 1997, vol. 40, No. 12, pp. 35–42.

(List continued on next page.)

Primary Examiner—Frantz Coby
(74) Attorney, Agent, or Firm—David M. Woods

(57) ABSTRACT

A user preference for a desired image is determined by using one or more examples and counterexamples of a desired image in order to define the user preference. A relative preference of a user for one or more image components or one or more depictive features is automatically extracted from the examples and counterexamples of the desired image. Then, a user subjective definition of a desired image is formulated using the relative preferences for either the image components or the depictive features.

48 Claims, 7 Drawing Sheets

OTHER PUBLICATIONS

"Interactive Learning with a Society of Models", by T. P. Minka, et al, Pattern Recognition, vol. 30, 1997, pp. 565–581.

The Concept of Media–Based Navigation and Its Implementation on Hypermedia System "Miyabi" by Kyoji Hirata and Yoshinori Hara. NEC Research and Development, vol. 35, No. 4, Oct. 1, 1994, pp. 410–419.

"An Image Database System with Fast Image Indexing Capability Based on Color Histograms" by Gong Yihong, Zhang Hongjiang, Chua Hock Chuan. Proceedings of the Region 10 Annual International Conference (Tenco, Singapore, Aug. 22–26, 1994, vol. 1, No. Conf. 9, pp. 407–411.

"The QBIC Project: Querying Images by Content Using Color, Texture, and Shape", by W. Niblack, R. Barber, W. Equitz, M. Flickner, E. Glasman, D. Petkovic, P. Yander, C. Faloustsos, G. Taubin. SPIE vol. 1908, Jan. 1, 1993, pp. 173–187.

* cited by examiner

METHOD AND COMPUTER PROGRAM PRODUCT FOR SUBJECTIVE IMAGE CONTENT SIMILARITY-BASED RETRIEVAL

FIELD OF THE INVENTION

This invention relates generally to the field of image processing and retrieval and, more specifically, to the search and retrieval of relevant images from a database of images.

BACKGROUND OF THE INVENTION

As more and more information is available electronically, the efficient search and retrieval of relevant information from vast databases becomes a challenging problem. Given an image database, selection of images that are similar to a given query (or example) image is an important problem in content-based image database management. There are two main issues of concern in the design of a technique for image similarity-based retrieval: image representation, and image similarity. Image representation is concerned with the content-based representation of images. Given a content-based image representation scheme, image similarity is concerned with the determination of similarity/dissimilarity of two images using a similarity measure based on that representation. Both image content and image similarity are very subjective in nature. User preference/subjectivity in a multimedia retrieval system is important because for a given image, the contents of interest and the relative importance of different image contents are application/viewer dependent. Even for a single viewer or application, the interpretation of an image's content may vary from one query to the next. Therefore, a successful content similarity-based image retrieval system should capture the preferences/subjectivity of each viewer/application and generate responses that are in accordance with the preferences/subjectivity.

Almost all existing commercial and academic image indexing and retrieval systems represent an image in terms of its low-level features such as color and texture properties, and image similarity is measured in the form of:

$$S(I,J) = \Sigma_i w_i^* D_{Fi}(I,J), i=1, \ldots, N$$

where S(I, J) is a function which measures the overall image similarity between images I and J, each image is represented in terms of N features, $F_i$, i={1, . . . , N}, $D_{Fi}$(I, J) is a function for computing the similarity/difference between image I and J based on the feature $F_i$, and $w_i$ is the weight, or importance, of feature $F_i$ in the overall image similarity decision [see W. Niblack, R. Barber, W. Equitz, M. Flickner, E. Glasman, D. Petkovic, P. Yanker, D. Faloutsos, and G. Taubin, "The QBIC Project: Querying Images By Content Using Color Texture, and Shape", SPIE Vol. 1908, 1993, pp173–187; U.S. Pat. No. 5,579,471, R. J. Barber et al., "Image Query System and Method", 1996; M. Stricker and M. Orengo, "Similarity of Color Images", SPIE Vol. 2420, 1995; S. Santini and R. Jain, "Similarity Queries in Image Databases", CVPR, 1996; J. Smith, and S. Chang, "Tools and Techniques for Color Image Retrieval", SPIE Vol. 2670, 1996; U.S. Pat. No. 5,652,881, M. Takahashi, K. Yanagi, and N. Iwai, "Still Picture Search/Retrieval Method Carried Out on the Basis of Color Information and System For Carrying Out the Same", 1997; J. K. Wu, A. D. Narasimhalu, B. M. Mehtre, C. P. Lam, Y. J. Gao, "CORE: a content-based Retrieval Engine for Multimedia Information Systems", Multimedia Systems, Vol. 3, 1996, pp25–41; W. Y. Ma, "NETRA: A Toolbox for Navigating Large Image Databases", Ph.D. Dissertation, UCSB, 1997; Y. Rui, S. Mehrotra, and M. Ortega, "A Relevance Feedback Architecture for Content-based Multimedia Information Retrieval Systems", IEEE Workshop on Content-based Access of Image and Video Libraries, 1997, pp82–89.].

In most of the systems cited above, either the weight $w_i$ for each feature $F_i$ is fixed, or the user manually provides the value to indicate his/her preferences regarding the relative importance of that feature. To a normal user, the different features and weights generally do not intuitively correlate to his/her interpretation of the query image and the desired query results. For example, some systems require the user to specify the relative importance of features such as color, texture, structure, and composition for processing a query. To an average user, what is meant by these different features, and what weights to assign to each one in order to obtain desired results is definitely unclear. The optimum combination of weights to use for a specific query toward a specific goal is highly dependent on the image description scheme and the similarity measure used by the system, and is not readily understood by the average user.

Recently, a few approaches have been proposed in order to overcome the above mentioned problems. These approaches require the user to identify a few relevant images from the query response. The set of relevant images is processed to automatically determine user preferences regarding the relative importance of different features or the preferred distance measure. One such approach was proposed in [Y. Rui, S. Mehrotra, and M. Ortega, "A Relevance Feedback Architecture for Content-based Multimedia Information Retrieval Systems", IEEE Workshop on Content-based Access of Image and Video Libraries, 1997, pp82–89]. Given a query, multiple ranked response sets are generated using a variety of representations and associated similarity measures. The default response set to the query is displayed. The user selects a few relevant images and provides their ranking. The response set that best matches the set of ranked relevant images is then selected as the preference-based query response. The major shortcomings of this approach are: (i) user preference cannot be specified without first processing a query; (ii) for a small set of ranked relevant images, the final response set may not be unique; and (iii) relative importance of individual components of a image representation cannot be modified based on the set of relevant images.

Another approach to user preference-based query processing is to arrange all database images in a virtual feature space. Users can "sift through" the different subsets of feature spaces and identify the desirable feature set for query processing [A. Gupta, S. Santini, R. Jain, "In Search of Information in Visual Media", Communications of the ACM, Vol. 40, No. 12, December, 1997, pp35–42]. While this approach alleviates the burden of fixed feature weights, the lack of correlation between user interpretation of image similarity and associated feature-based representation still remains. Furthermore, since complete global image representations are used for images with multiple subjects or regions of interest, a subset of feature space that corresponds to user preference may not exist.

A natural approach to capture a user's preferences for image similarity computation is to automatically extract/derive such information from the user supplied positive examples and negative examples of desired images. The derived preferences can then be used to automatically determine similarity measures. An existing system, "society of models", of Minka & Picard [T. P. Minka and R. W. Picard, "Interactive Learning with a Society of Models", Pattern Recognition, Vol. 30, 1997, pp565–581], adopts this approach. The system employs a variety of feature-based image representations and associated similarity measures to generate several different similarity-based hierarchical clusters of images in a database. The user supplied positive and negative examples are used to identify the image clusters preferred by the user. All images in the preferred clusters form the set of images desired by the user. The image clusters can be dynamically adapted based on user supplied examples of desired or undesired images. This process of modifying clusters is very time consuming for large databases. Another system called NETRA [W. Y. Ma, "NETRA: A Toolbox for Navigating Large Image Databases", Ph.D. Dissertation, UCSB, 1997] also utilizes feature similarity-based image clusters to generate user preference-based query response. This system has restricted feature-based representations and clustering schemes. The main drawbacks of both these system are (i) the database is required to be static (i.e., images cannot be dynamically added or deleted from the database without complete database re-clustering); (ii) usually, a large number of positive and negative examples need to be provided by the user in order for the system to determine image clusters that correspond to the set of desired images.

SUMMARY OF THE INVENTION

The present invention proposes a general framework or system for user preference-based query processing. This framework overcomes the shortcomings of the existing approaches to capture and utilize user preferences for image retrieval.

An object of this invention is to provide a generalized user-friendly scheme to automatically determine user preferences for desired images and to perform preference-based image retrieval.

A second object is to provide a system for user preference-based image retrieval from a dynamic database of images. That is, images can be added/deleted from the database dynamically without requiring complete database reorganization.

A third object is to provide an approach to efficiently determine the relative importance of individual components of the image representation scheme from user supplied examples and counterexamples.

These and other objects will become clear in the following discussion of the preferred embodiment.

Briefly summarized, according to one aspect of the present invention, the invention resides in a method for learning a user preference for a desired image, the method comprising the steps of: using either one or more examples or counterexamples of a desired image for defining a user preference; extracting a relative preference of a user for either one or more image components or one or more depictive features from the examples and/or counterexamples of desired images; and formulating a user subjective definition of a desired image using the relative preferences for either image components or depictive features.

DETAILED DESCRIPTION OF THE INVENTION

In the following description, the present invention will be described in the preferred embodiment as a software program. Those skilled in the art will readily recognize that the equivalent of such software may also be constructed in hardware. Consequently, the term "computer program product" as used herein is equivalent to an electronic system containing hardware to product the result of the software.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
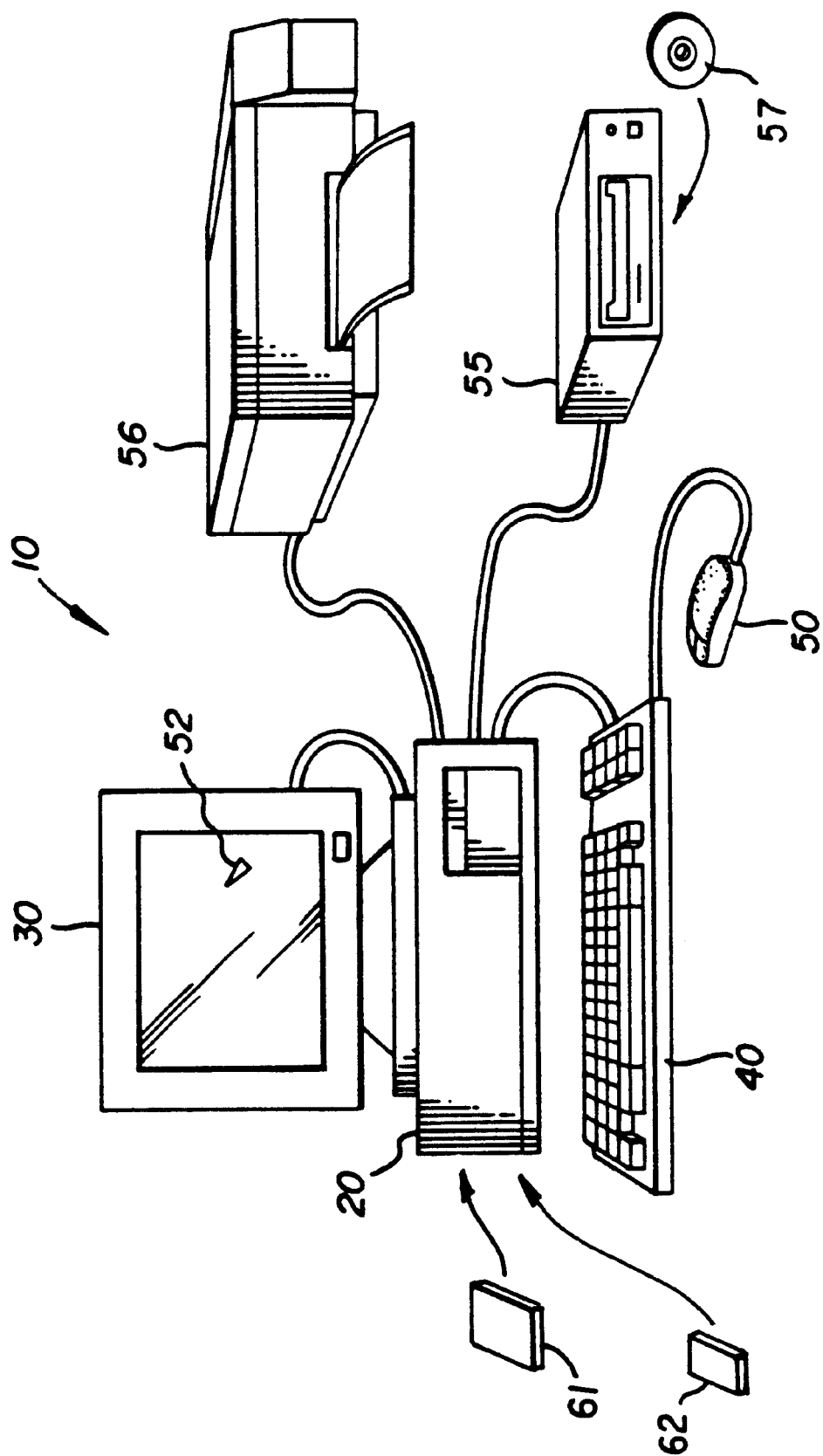
FIG. 1 is a perspective drawing of a computer workstation that may be used for implementing the present invention.

Referring to FIG. 1, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor-based unit for receiving and processing software programs and for performing other processing functions. A display 30 is electrically connected to the microprocessor-based unit 20 for displaying user-related information associated with the software. A keyboard 40 is also connected to the microprocessor based unit 20 for permitting a user to input information to the software. As an alternative to using the keyboard 40 for input, a mouse 50 may be used for moving a selector 52 on the display 30 and for selecting an item on which the selector 52 overlays, as is well known in the art.

A compact disk-read only memory (CD-ROM) 55 is connected to the microprocessor based unit 20 for receiving software programs and for providing a means of inputting the software programs and other information to the microprocessor based unit 20 via a compact disk 57, which typically includes a software program. In addition, a floppy disk 61 may also include a software program, and is inserted into the microprocessor-based unit 20 for inputting the software program. Still further, the microprocessor-based unit 20 may be programmed, as is well know in the art, for storing the software program internally. A printer 56 is connected to the microprocessor-based unit 20 for printing a hardcopy of the output of the computer system 10.

Images may also be displayed on the display 30 via a personal computer card (PC card) 62 or, as it was formerly known, a personal computer memory card international association card (PCMCIA card) which contains digitized images electronically embodied in the card 62. The PC card 62 is ultimately inserted into the microprocessor based unit 20 for permitting visual display of the image on the display 30.

This invention presents a user preference based query processing system framework that adaptively retrieves database images according to different user's notion of similarity. The overall system consists of three functional phases: image registration phase, user preference understanding phase, and preference-based image retrieval phase.

Figure 2:
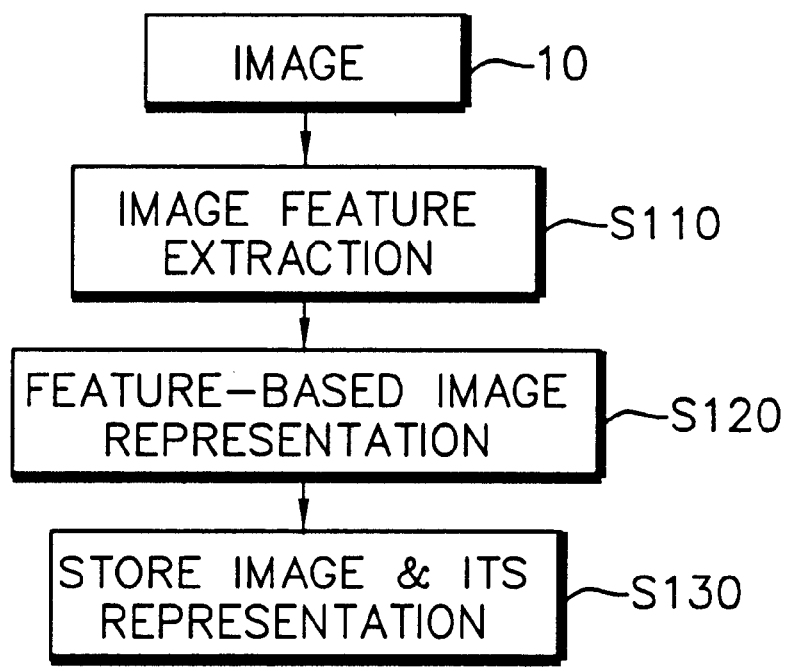
FIG. 2 is a flowchart of an overview of the image registration phase of the present invention.
Figure 4:
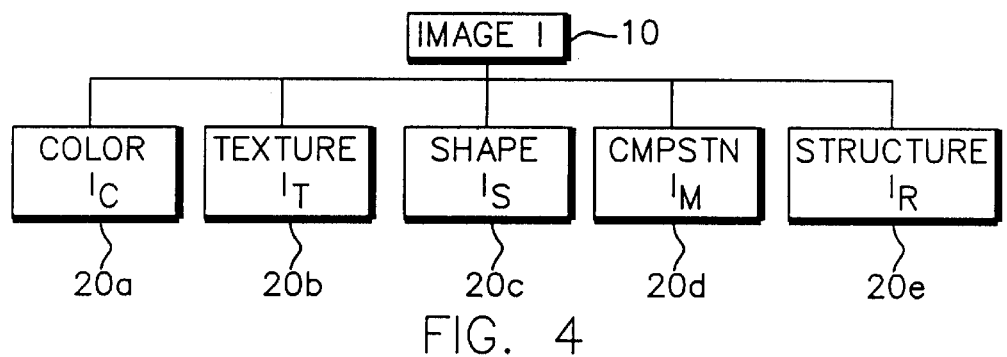
FIG. 4 is a diagram illustrating a plurality of specific features at the feature level of the image.

In the image registration phase of the system/framework, the database is populated with images. Referring to FIG. 2, as an image 10 is inserted (or registered) into the database of the computer system 10, a set of feature extraction techniques is applied S110 to the image 10 to extract all the relevant information, or metadata, needed for representing the image. Those skilled in the art will recognize that a variety of methods exist for extracting image features such as color contents, texture contents, regions, and boundaries, etc. For example, referring to FIG. 4, color 20*a*, texture 20*b*, shape 20*c*, composition 20*d*, and structure based 20*e* image features are extracted to represent an image 10. The next step is to represent the image 10 in terms of its extracted features S120.

Figure 3:
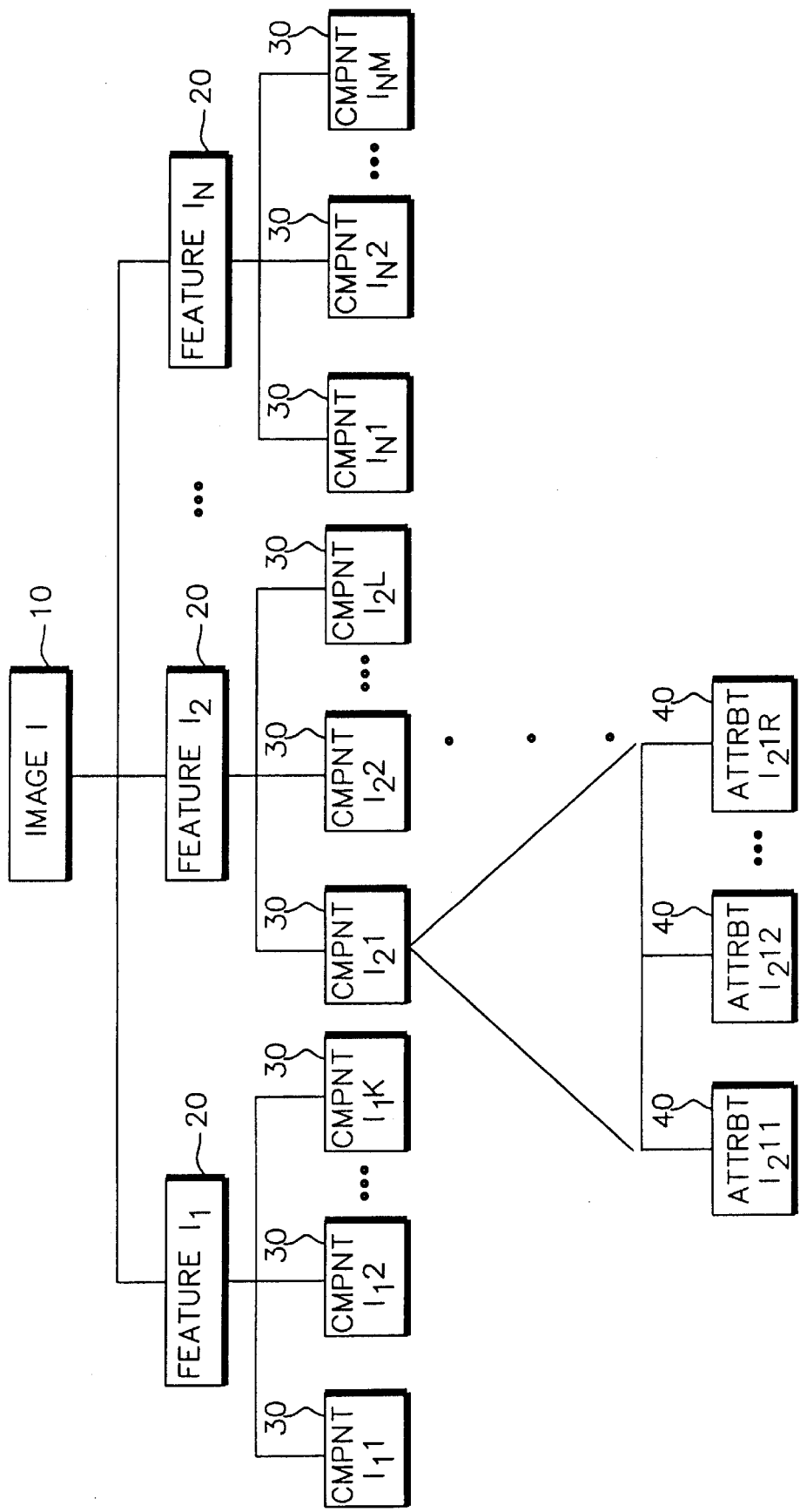
FIG. 3 is a diagram illustrating an image and its associated sub-levels that are derived from the image all of which are used by the present invention.

Referring to FIG. 3, in the preferred embodiment, an image 10 is represented as a set of multiple multi-level feature-based representations 20. For instance, an image I is represented as I={$I_{F1}, I_{F2}, \ldots, I_{FN}$}, where $I_{Fi}$ is image I represented in terms of feature $F_i$, where i is in range [1 ... N]. Each $I_{Fi}$ is a hierarchical representation consisting of one or more levels. The highest level of the representation of $I_{Fi}$ is of the form $I_{Fi}=\{C_{IFi}^1, C_{IFi}^2, \ldots, C_{IFi}^M\}$ where $C_{IFi}^j$ (30) denotes the $j_{th}$ component of $I_{Fi}$. Each $C_{IFi}^j$ can in turn be described by its set of sub-components. At the lowest level of a feature-based image representation, each component or sub-component is represented by a set of attribute values 40.

Figure 5:
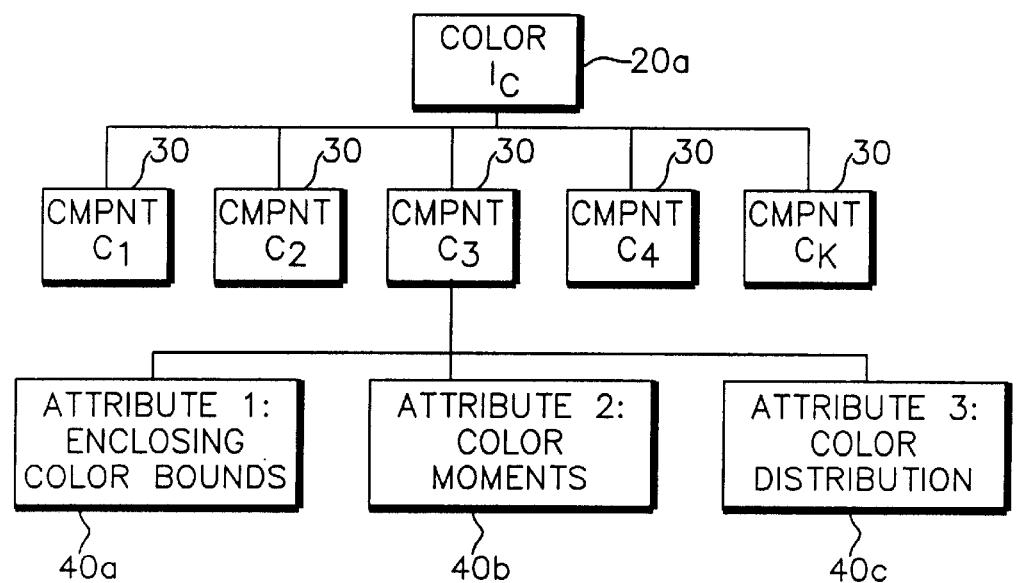
FIG. 5 is a diagram illustrating the sub-levels of the color feature of the image.
Figure 6:
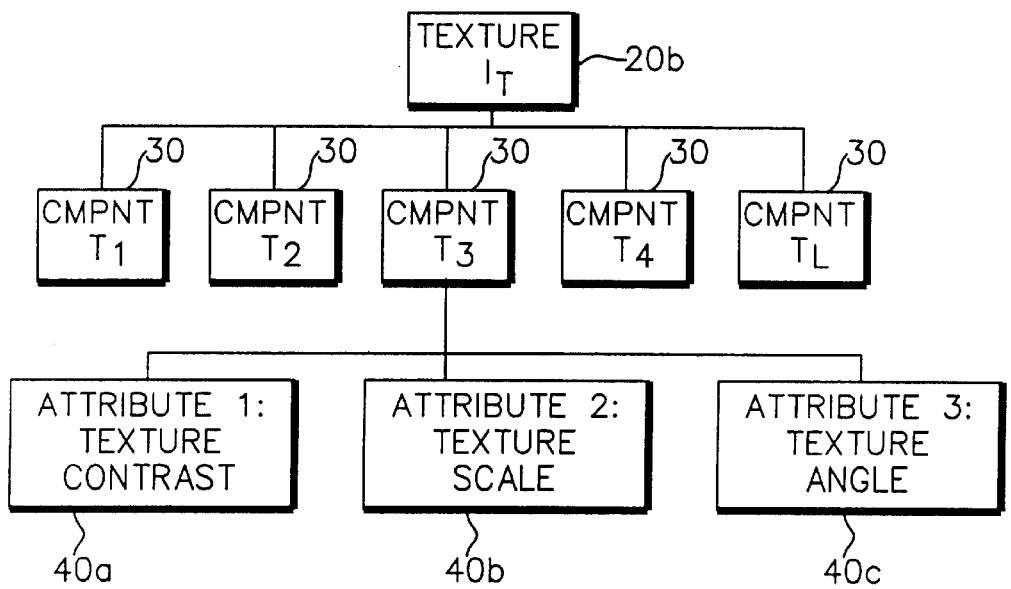
FIG. 6 is a diagram illustrating the sub-levels of the texture level of the image.

In the preferred embodiment, a number of multilevel feature-based representations are employed (examples of two such representations are shown in FIG. 5 and FIG. 6). Those skilled in art will recognize that any number of feature-based representations can be used to generate such an image representation hierarchy. Referring now to FIGS. 5 and 6, for example, in the preferred embodiment of image representation using color feature 20*a*, a color-based representation of an image is of the form $I_C=\{C_1, C_2, \ldots, C_K\}$ where $C_j$30 denotes the $j_{th}$ dominant color segment in the three-dimensional color space spanned by image I. Each $C_j$ is in turn described by one or more of its attribute sets 40. In the preferred embodiment, one attribute set 40 describes the color space segment in terms of its color range 40*a*, which can be expressed either as dimensions of an enclosing box, or an enclosing ellipsoid. Another attribute set describes the color space segment in terms of its color moments 40*b*, such as color mean, variance, and skewness. Yet another attribute set describes the color segment by the color distribution 40*c* within the segment. Those skilled in the art will recognize that any number of other metrics can be used to describe the segment. Referring back to FIG. 2, the final step of the image registration process is to store input image 10 and its associated representations into the database S130. Those skilled in art will recognize that several ways for organizing images and their representations in a database are possible. For example, flat files can be used to organize image representations and associated links to image files. Multidimensional spatial and point access methods can also be utilized to organize the feature-based image representations. In the preferred embodiment, R-tree based indices are used to organize the image representations. The populated database can then be queried to retrieve desired images.

Figure 7:
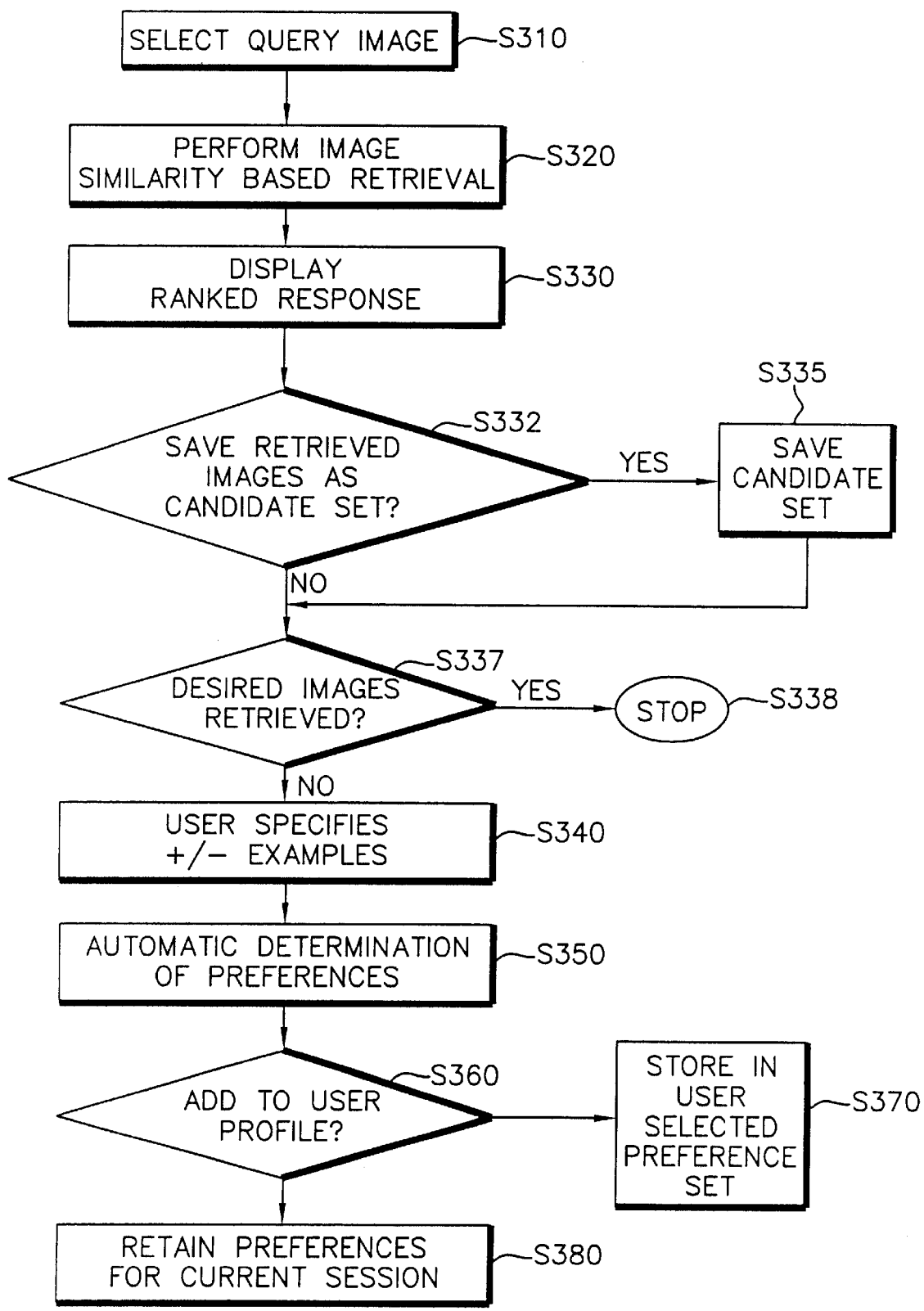
FIG. 7 is a flowchart illustrating a software program of the present invention for obtaining user preferences.

The user preference understanding phase of the system/framework is concerned with automatic extraction of user preferences for desired images via user interactions. There are two options to acquire user preferences:

Query-based option—This option performs a query with default preferences to provide a response set. If needed, a user can then provide one or more examples and/or counterexamples of desired response images from the response set. A preferred embodiment of option 1 is shown in FIG. 7. An image is first selected by the user as the query image S310. Next, images similar to the query image are retrieved using default preferences S320. A representation-based similarity measure is used to identify and retrieve images that are similar to the query image. Therefore the similarity measure used by a system is dependent on the underlying image representation scheme. In general, the similarity measure is of the form $S(A, B)=Sim(R_A, R_B)$ Where S(A, B) denotes the similarity of images A and B having representations $R_A$ and $R_B$, respectively. Sim( ) denotes the representation-based similarity measure. For a multi-feature-based image representation scheme, where an image I is represented as $R_I=\{R_I^{F1}, R_I^{F2}, \ldots, R_I^{FN}\}$, $Sim(R_A, R_B)$ can be of the form $$Sim(R_A, R_b) = \Sigma_i w_i * D_{Fi}(R_A, R_B), i=1, \ldots N$$

where $D_{Fi}(R_A, R_B)$ denotes the similarity of image representations $R_A^{Fi}$ and $R_B^{Fi}$ with respect to feature $F_i$, and $w_i$ denotes the relative importance of feature $F_i$. Those skilled in art will recognize that this similarity scheme can be generalized to a multi-level hierarchical image representation scheme. Furthermore, other methods of aggregating $D_{Fi}$'s to obtain Sim( ) are also possible. At the lowest level of the hierarchical representation, similarity is determined by the similarity of the attribute values. For example, the attribute sets used in our embodiment of color-based image representation can be compared using the following measures. The similarity of two color space segments represented by the segment's bounding range dimension attribute set can be computed as the degree of overlap of the two bounding regions. The similarity of two color space segments represented as color moments can be computed as the Euclidean, absolute value distance, or Mahalanobis distance. The similarity of two color space segments represented by color distributions can be determined using one of the following distance metrics:

$$\text{I.} \quad H_D(x, y) = \sum_{i=0}^{N} w_i * \frac{\text{Min}(x_i, y_i)}{\text{Max}(x_i, y_i)}$$

$$\text{II.} \quad H_D(x, y) = \sum_{i=0}^{N} w_i * \left(1 - \frac{|x_i - y_i|}{x_i + y_i}\right)$$

$$\text{III.} \quad H_D(x, y) = \sum_{i=0}^{N} \text{Min}(x_i, y_i)$$

where x and y are the two respective distributions of the two color space segments under comparison, $x_i$ and $y_i$ are the normalized frequency values. Those skilled in the art would recognize that similarity values obtained for different attribute level representations can be combined in various ways to obtain an overall similarity at the next level of the hierarchical representation.

Those skilled in the art would also recognize that the image retrieval process is also dependent on the way the image representations are organized in the database. For example, if image representations are stored in flat files, then most likely every image in the database need to be compared with the query image to identify similar images. A more efficient way of selecting candidate similar images can be achieved by organizing image representations in efficient indices. In our embodiment, multidimensional spatial and point access methods are used to organize image representations. For example, our color-based image representations can be organized using index structures based on bounding regions, color moments, and/or color distribution. The approach adopted in preferred embodiment is to organize color-based image representations using only one of the representation components, and using the complete representation components for computing image similarities. For example, the bounding region component of the color-based representation of color space segments is used to organize all the color space segments belonging to database images in an R-tree like index structure. For this organization scheme, given a query image, the index is searched to identify color space segments with bounding regions overlapping the bounding regions of the query image color space segments. Images associated with these overlapping segments are considered to be candidate images. Color distribution values and color moment values are used to compute the overall similarity between the candidate images and the query image. The computed similarity is used to rank the candidate image set. The ranked images are then displayed to the user S330. User can elect to save the candidate image set S332 for later use. Three options exist for saving the candidate image set S335:

1. Cluster-based—This option treats the candidate set as a static image collection, and generates hierarchical clusters using various image representation component-based similarities, as reported in [T. P. Minka and R. W. Picard, "Interactive Learning with a Society of Models", Pattern Recognition, Vol. 30, 1997, pp565–581]. These clusters are then stored in a storage medium.

2. Rank-set-based—This option uses a set of different representation-based similarity measures to obtain the corresponding ranking of the images in the candidate image sets, as reported in [Y. Rui, S. Mehrotra, and M. Ortega, "A Relevance Feedback Architecture for Content-based Multimedia Information Retrieval Systems", IEEE Workshop on Content-based Access of Image and Video Libraries, 1997, pp82–89]. These ranked candidate sets are then stored in a storage medium.

3. Matching-component-based—This option simply saves the candidate image set in a storage medium. In addition, for each candidate image representation component, the matching query component, and the associated match quality are also stored.

One or more of these options can be selected at the time of system initialization.

If the displayed candidate set meets the user's preference for desired images S337, then the process is terminated S338. Otherwise, user interactions are required to obtain examples (shown as + in FIG. 7) and/or counterexamples (shown as − in FIG. 7) of desired images S340. User provided examples and counterexamples are processed in conjunction with the saved candidate set to automatically infer user preferences for the desired response S350. The user preference determination process is dependent on the option selected for saving the initial candidate image set. For cluster-based option of saving the candidate set, examples and counterexamples are used to identify representation components, and the associated segments of cluster hierarchy that contain example components but no counterexample components. A similar approach is adopted in [T. P. Minka and R. W. Picard, "Interactive Learning with a Society of Models", Pattern Recognition, Vol.30, 1997, pp565–581]. This information is used to derive the representations of desired images, that is, the images desired by the user are required to have the derived representations. For rank-set-based option of saving the candidate image set, the user is required to input the desired rankings of some example images. The user supplied rankings are used to identify the stored ranked candidate set in which the rankings of the example images most closely match the user provided rankings. This information is used to identify the preferred representation and associated similarity measure from a fixed set of representations and similarity measures (those that were used in generating the ranked candidate sets in step S335). A similar approach is adopted in [Y. Rui, S. Mehrotra, and M. Ortega, "A Relevance Feedback Architecture for Content-based Multimedia Information Retrieval Systems", IEEE Workshop on Content-based Access of Image and Video Libraries, 1997, pp82–89]. For matched component based option of saving the candidate image set, the examples and counterexamples are used to derive the relative importance of various representation components at all levels of the representation hierarchy. At any given level of representation hierarchy, the relative importance of a query image representation component is determined by the number of matching example and counterexample image components, and their matching quality. Every occurrence of a matching component in an example image increases the relative importance of that query image representation component in proportion to the quality of match. Similarly, every occurrence of a matching component in a counterexample image decreases the relative importance of that query image representation component in proportion to the quality of match. Those skilled in the art would recognize that other options for saving candidate sets and deriving user preferences can be employed within the scope of this invention.

The derived user preferences can be stored permanently or temporarily. If the user elects to store the derived preferences in his/her user profile S360, a preference record containing the query image representation and the derived preferences are added to a user selected preference set S370. Any duplicate preference record detection method can be used to avoid duplicate preferences records in a preference set. If the user does not elect to add the derived preferences to his/her user profile S360, the preference record which contains the current query image representation is retained for use in the current session S380.

Figure 8:
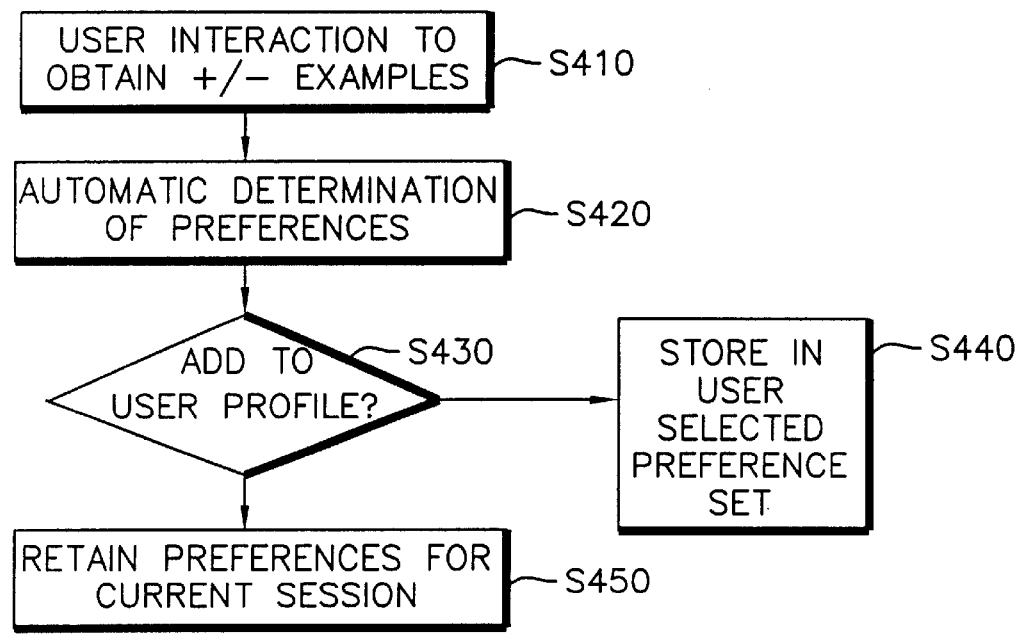
FIG. 8 is an alternative embodiment of FIG. 7.

Non query-based option—This option of determining user preferences does not involve any initial query processing. The main steps of the embodiment are shown in FIG. 8. The process starts by user interaction to obtain examples (shown as '+' in FIG. 8) and counterexamples (shown as '−' in FIG. 8) of desired images S410. User can specify actual image ID's for the example and counterexample images, or use random browser to select such images. These examples and counterexamples are then used to extract user preferences S420. The preferred embodiment offers two options for determining user preferences:

1. Cluster-based—This option is in principle the same as the cluster-based option of saving the candidate set S335 (FIG. 7) in the query-based user preference understanding process as described earlier. For this option to be applicable, the image database must be static, and the hierarchical clusters must have been generated and stored at the end of the image registration process S130 (FIG. 2). User supplied examples and counterexamples are used to identify representation components, and the associated segments of cluster hierarchy that contain example components but no counterexample components. A similar approach is adopted in [T. P. Minka and R. W. Picard, "Interactive Learning with a Society of Models", Pattern Recognition, Vol.30, 1997, pp565–581]. This information is used to derive the representations of desired images, that is, the images desired by the user are required to have the derived representations.

2. Matching component-based—This option is again in principle the same as the matching component-based option of saving the candidate set S335 (FIG. 7) in the query-based user preference understanding process as described earlier. A pseudo-query image representation is generated by the union of all the image representations of the user supplied example images. The user supplied examples and counterexamples are used to derive the relative importance of various representation components at all levels of the representation hierarchy of the pseudo-query representation. At any given level of representation hierarchy, the relative importance of a pseudo-query image representation component is determined by the number of matching example and counterexample image components, and their matching quality. Every occurrence of a matching component in an example image increases the relative importance of that pseudo-query image representation component in proportion to the quality of match. Similarly, every occurrence of a matching component in a counterexample image decreases the relative importance of that pseudo-query image representation component in proportion to the quality of match.

The derived user preferences can then be stored permanently or temporarily. If the user elects to store the derived preferences in his/her user profile S430, a preference record containing the pseudo-query image representation and the derived preferences are added to a user selected preference set S440. Any duplicate preference record detection method can be used to avoid duplicate preferences records in a preference set. If the user does not elect to add the derived preferences to his/her user profile S430, the preference record is retained for use in the current session S450.

The above process of determining user preferences can be repeated as many times as desired to update or modify the preference records.

Figure 9:
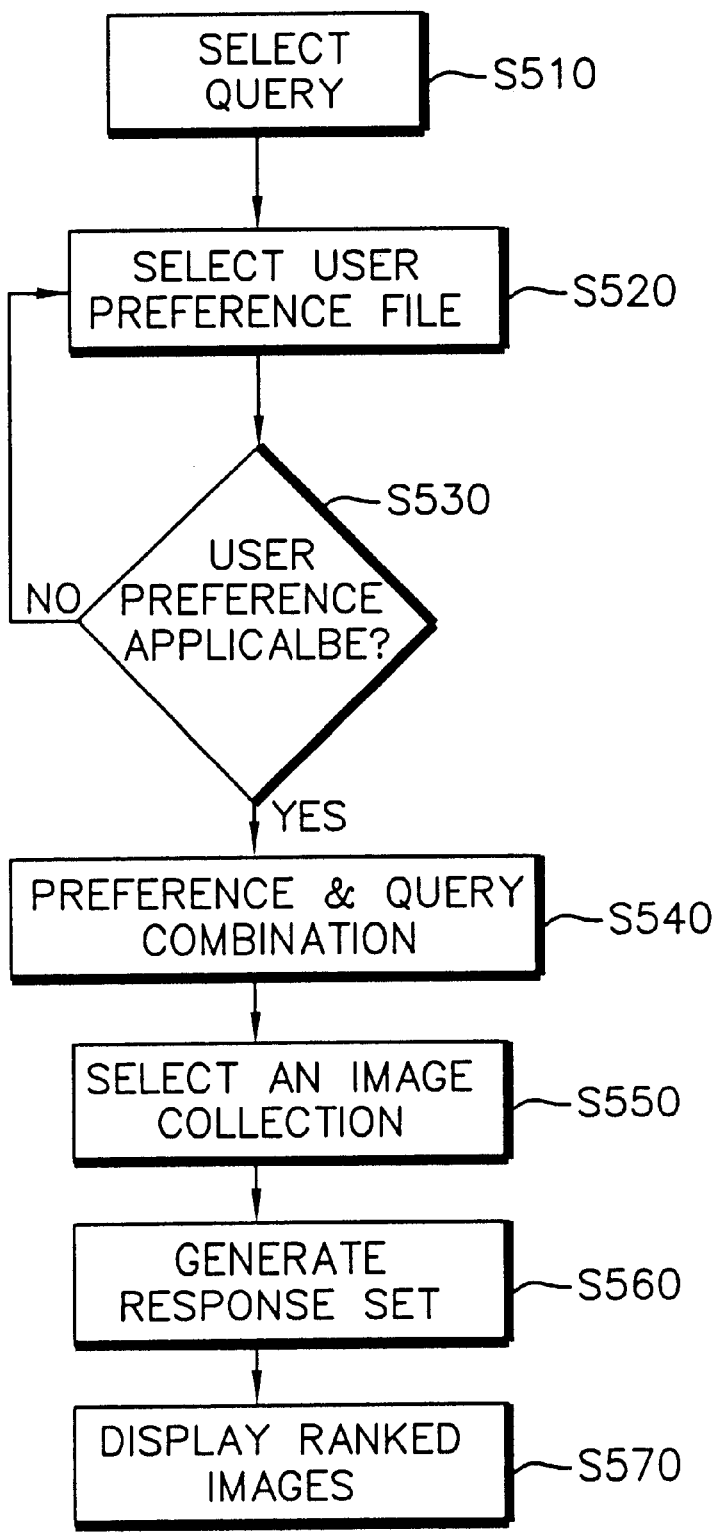
FIG. 9 is a flowchart illustrating the selection of images from a database using the present invention.

The user preference based retrieval phase of the present system/framework allows the user to query for desired images using user specified preferences. Two embodiments for this functional phase are available in our system:

1. Query image and preference combination—The embodiment of this type of retrieval is shown in FIG. 9. For this type of retrieval, user specifies a query image S510, and a preference file S520. An automatic preference applicability check is performed S530 to determine whether this user-selected preference is compatible with the user-selected query. The method used to perform the applicability check is again dependent on the preference understanding option used. For the cluster-based preferences, the query image must belong to one of the preferred clusters. For the ranked set preferences, the components in the user selected query and the components in the saved preference file are compared. The number of components that are in the user-selected query must match a certain number of components in the preference file. The threshold number of matching components is adjustable and can be set at initial system installation time. The same applicability test is applied to the matching component-based preferences. If the preference file chosen by the user is not applicable to this particular query, the user must select another preference file, or return to the user preference understanding phase to specify a preference. When an applicable preference is available, the next step in the process is to combine the information in the preference files with the user-selected query S540. In case of cluster-based preferences, this step is not needed. For the other two types of preferences, the components in the user-selected query are used for the actual querying, the preference files simply provides the weight information associated with these components. For matching component-based preferences, default weights are associated with the components in the user-supplied query that are not in the query/pseudo-query stored in the preference file. After an applicable preference file is selected and combined with the query representation, user selects an image collection S550 which is used for image retrieval. The image collection can be one of the previously stored candidate image sets, or the entire image database. A response set is generated S560 from the selected image collection set using the preference-query combination. The process of generating the response set is dependent on the preference understanding option. For the cluster-based preference understanding, the images belonging to the clusters identified in the preference file form the response set. Optionally, ranking can be generated for the images in the response set using any representation-based similarity measure. For the ranked set-based preference understanding, the preferred representation scheme is used to identify the desired images from the selected image collection. The identified images are then ranked using the preferred similarity measure. For the matching component-based preferences, the selected query image representation is used to identify desired images from the selected image collection. The preferred weights for the representation components are then used to determine the overall similarity of desired images to the query image and their rankings. The desired images along with their rankings form the response set to the query. This response set is then displayed to the user S570.

Figure 10:
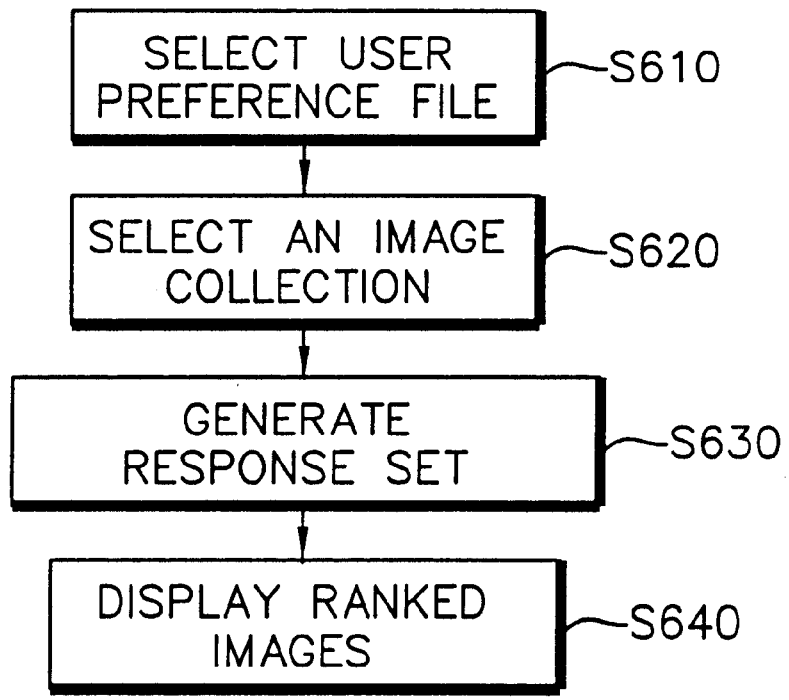
FIG. 10 is a flowchart illustrating a summary of a portion of the present invention.

2. Preference only retrieval—The embodiment of this type of retrieval is shown in FIG. 10. User selects a preference set S610, and also an image collection S620. The image collection can be one of the previously stored candidate image sets, or the entire image database. A response set is generated S630 from the selected image collection set using the selected preferences. The process of generating the response set is dependent on the preference understanding option. For this type of retrieval, only the cluster-based or matching component-based preferences can be used. For the cluster-based preference understanding, the images belonging to the clusters identified in the preference file form the response set. Optionally, ranking can be generated for the images in the response set using any representation-based similarity measure. For the matching component-based preferences, the query or pseudo-query image representation is used to perform image similarity based retrieval from the selected image collection. The selected images are then ranked using a representation based similarity measure using the relative importance values in the preference file. This response set is then displayed to the user S640.

The process of understanding user preference and applying that for preference-based query processing can be repeated until the desired response to the query is obtained.

Figure 11:
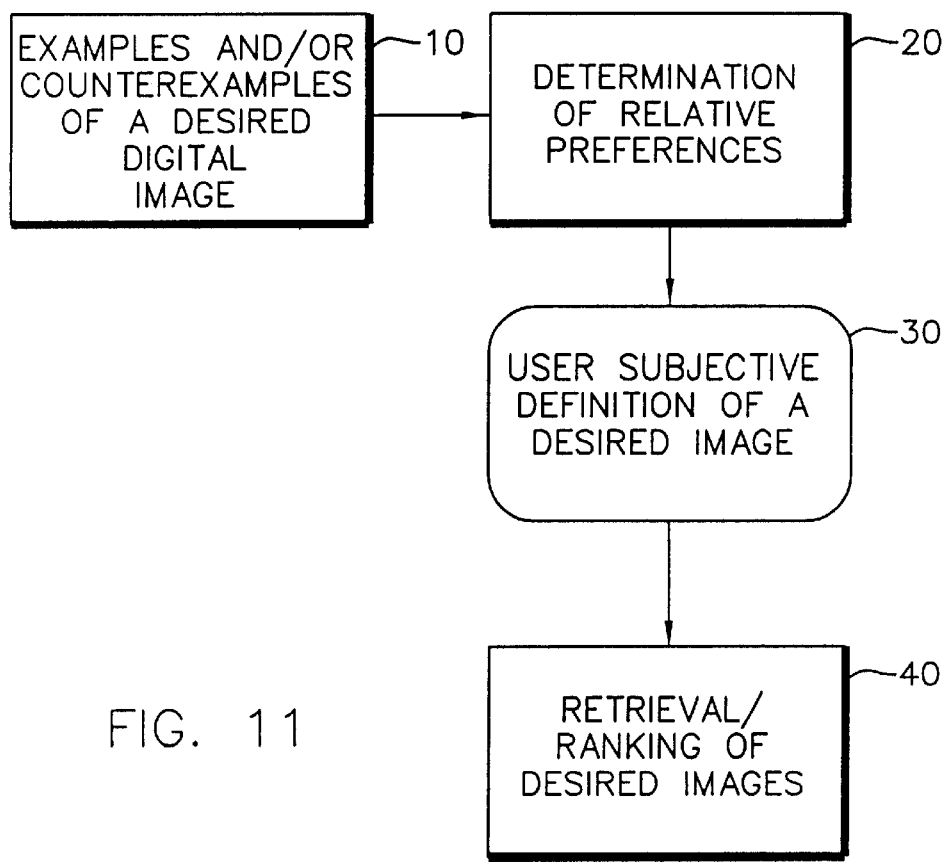
FIG. 11 is a flowchart illustrating a summary of the invention.

In summary, this invention relates generally to the field of digital image processing and digital image understanding, and more particular to subjective image content similarity-based retrieval. With reference to FIG. 11, the user supplied example(s) and/or counterexample(s) of desired digital images 10 are digitally processed 20 to determine the user's relative preference for different image components and/or depictive features. The result 30 obtained from processing step 20, which is the user's subjective definition of a desired image, is used in an operation step 40 wherein the retrieval of the desired images from a database is performed based upon the result 30.

We claim:

1. A method for learning a user preference for a desired image, the method comprising the steps of:
   (a) using one or more examples and counterexamples of a desired image for defining a user preference;
   (b) computing a relative preference of a user for either one or more image components or one or more depictive features based on a frequency of occurrence of the image component or depictive feature in the examples and counterexamples of a desired image; and
   (c) formulating a user subjective definition of a desired image using the relative preference for either image components or depictive features.

2. The method as in claim 1, wherein step (b) further comprises identifying similar and dissimilar image components among examples and counterexamples of said desired image.

3. The method as in claim 2, where in an image component can be either an entire image or a segment of the image.

4. The method as in claim 1, wherein step (b) further comprises identifying similar and dissimilar depictive features of either the image components or the image among the examples and counterexamples of said desired image.

5. The method as in claim 4, wherein depictive features include color, color composition, texture, structure, and shape.

6. The method as in claim 1, wherein step (b) further comprises computing the relative preference for an image component based on a similarity of the image components among examples and counter examples of said desired image.

7. The method as in claim 1, wherein step (b) further comprises computing the relative preference for a depictive feature based on a similarity of the depictive feature among examples and counter examples of said desired image.

8. The method as in claim 1, wherein step (c) of formulating the definition of said desired image includes a list of either desired or undesired image components and the relative preferences of said components to the user.

9. The method as in claim 1, wherein step (c) of formulating the definition of said desired image includes a list of either desired or undesired depictive features of either an image component or an image and their relative preferences to the user.

10. The method as in claim 1, further comprising the step of storing the user subjective definition.

11. A method for retrieving user desired images comprising the steps of
   (a) formulating a user subjective definition of a desired image using either image components or depictive features from one or more examples and counterexamples of a desired image comprising;
      (a1) extracting a relative preference of a user for either an image component or a depictive feature based on the frequency of occurrence of the image component or depictive feature in the examples and counterexamples of a desired image; and
   (b) applying the user subjective definition of a desired image to identify and retrieve a user desired image.

12. The method as in claim 11, wherein step (a) further comprises identifying similar and dissimilar image components among examples and counterexamples of said desired image.

13. The method as in claim 12, wherein said image component can be either an entire image or a segment of the image.

14. The method as in claim 11, wherein step (a) further comprises identifying similar and dissimilar depictive features of either image components or image among the examples and counterexamples of said desired image.

15. The method as in claim 14, wherein depictive features include color, color composition, texture, structure, and shape.

16. The method as in claim 11, wherein step (a) further comprises computing the relative preference for an image component based on a similarity of the image components among examples and counter examples of said desired image.

17. The method as in claim 11, wherein step (a) further comprises computing the relative preference for a depictive feature based on a similarity of the depictive feature among examples and counter examples of said desired image.

18. The method as in claim 11, wherein step (a) of formulating the definition of said desired image includes a list of either desired or undesired image components and their relative preferences to the user.

19. The method as in claim 11, wherein step (a) of formulating the definition of said desired image includes a list of either desired or undesired depictive features of either an image component or an image and their relative preferences to the user.

20. The method as in claim 11 wherein step (b) further comprises selecting images containing either one or more desired image components or one or more desired depictive features from a database.

21. The method as in claim 11 wherein step (b) comprises applying the user subjective definition of said desired image to a user specified query image to retrieve desired images.

22. The method as in claim 21, wherein step (b) comprises applying a subset of the user subjective definition of said desired image consisting of the relative preferences for either the image components or depictive features present in the query image.

23. The method as in claim 11, wherein step (b) further comprising the step of ranking retrieved images based on the relative preference of either the image components or the depictive features.

24. The method as in claim 11 further comprising the step of displaying the retrieved images.

25. A computer program product for learning a user preference for a desired image, comprising a computer readable storage medium having a computer program stored thereon for performing the steps of
   (a) using one or more examples and counterexamples of a desired image for defining a user preference;
   b) extracting a relative preference of a user for either one or more image components or one or more depictive features based on the frequency of occurrence of the image component or depictive feature in the examples and counterexamples of a desired image; and
   (c) formulating a user subjective definition of a desired image using the relative preferences for either image components or depictive features.

26. The computer program product as in claim 25, wherein step (b) further comprises identifying similar and dissimilar image components among examples and/or counterexamples of said desired image.

27. The computer program product as in claim 26, wherein an image component can be either an entire image or a segment of the image.

28. The computer program product as in claim 25, wherein step (b) further comprises identifying similar and dissimilar depictive features of either the image components or the image among the examples and counterexamples of said desired image.

29. The computer program product as in claim 28, wherein depictive features include color, color composition, texture, structure, and shape.

30. The computer program product as in claim 25, wherein step (b) further comprises computing the relative preference for an image component based on a similarity of the image components among examples and counter examples of said desired image.

31. The computer program product as in claim 25, wherein step (b) further comprises computing the relative preference for a depictive feature based on a similarity of the depictive feature among examples and counter examples of said desired image.

32. The computer program product as in claim 25, wherein step (c) of formulating the definition of said desired image includes a list of either desired or undesired image components and their relative preferences to the user.

33. The computer program product as in claim 25, wherein step (c) of formulating the definition of said desired image includes a list of either desired or undesired depictive features of either an image component or an image and their relative preferences to the user.

34. The computer program product as in claim 25, further comprising the step of storing the user subjective definition.

35. A computer program product for retrieving user desired images comprising the steps of
(a) formulating a user subjective definition of a desired image using either image components or depictive features from one or more examples and counterexamples of a desired image comprising;
  (a1) extracting a relative preference of a user for either an image component or a depictive feature based on the frequency of occurrence of the image component or depictive feature in the examples and counterexamples of a desired image; and
(b) applying the user subjective definition of a desired image to identify and retrieve the user desired images.

36. The computer program product as in claim 35, wherein step (a) further comprises identifying similar and dissimilar image components among examples and counterexamples of said desired image.

37. The computer program product as in claim 36, wherein an image component can be either an entire image or a segment of the image.

38. The computer program product as in claim 35, wherein step (a) further comprises identifying similar and dissimilar depictive features of either image components or image among the examples and counterexamples of said desired image.

39. The computer program product as in claim 38, wherein depictive features include color, color composition, texture, structure, and shape.

40. The computer program product as in claim 35, wherein step (a) further comprises computing the relative preference for an image component based on a similarity of the image components among examples and counter examples of said desired image.

41. The computer program product as in claim 35, wherein step (a) further comprises computing the relative preference for a depictive feature based on a similarity of the depictive feature among examples and counter examples of said desired image.

42. The computer program product as in claim 35, wherein step (a) of formulating the definition of said desired image includes a list of either desired or undesired image components and their relative preferences to the user.

43. The computer program product as in claim 35, wherein step (a) of formulating the definition of said desired image includes a list of either desired or undesired depictive features of either an image component or an image and their relative preferences to the user.

44. The computer program product as in claim 35 wherein step (b) further comprises selecting images containing either one or more desired image components or one or more desired depictive features from a database.

45. The computer program product as in claim 35 wherein step (b) comprises applying the user subjective definition of said desired image to a user specified query image to retrieve desired images.

46. The computer program product as in claim 45, wherein step (b) comprises applying a subset of the user subjective definition of said desired image consisting of the relative preferences for either the image components or depictive features present in the query image.

47. The computer program product as in claim 35, wherein step (b) further comprising the step of ranking retrieved images based on the relative preference of either the image components or the depictive features.

48. The computer program product as in claim 35 further comprising the step of displaying the retrieved images.

* * * * *